(12) United States Patent
Lee

(10) Patent No.: US 10,670,213 B2
(45) Date of Patent: Jun. 2, 2020

(54) VEHICLE LAMP DEVICE AND METHOD OF MANUFACTURING THE SAME

(71) Applicant: SAMSUNG ELECTRONICS CO., LTD., Suwon-si, Gyeonggi-do (KR)

(72) Inventor: Yeon-Woo Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/238,704

(22) Filed: Jan. 3, 2019

(65) Prior Publication Data

US 2019/0368676 A1 Dec. 5, 2019

(30) Foreign Application Priority Data

May 31, 2018 (KR) .................. 10-2018-0062924

(51) Int. Cl.
| | |
|---|---|
| *F21V 23/00* | (2015.01) |
| *F21S 41/19* | (2018.01) |
| *F21S 43/19* | (2018.01) |
| *F21S 45/47* | (2018.01) |
| *B60Q 1/20* | (2006.01) |
| *B60Q 1/26* | (2006.01) |
| *B60Q 1/44* | (2006.01) |
| *B60Q 1/00* | (2006.01) |
| *F21Y 115/10* | (2016.01) |

(52) U.S. Cl.
CPC .......... *F21S 41/192* (2018.01); *B60Q 1/0088* (2013.01); *B60Q 1/20* (2013.01); *B60Q 1/2696* (2013.01); *B60Q 1/44* (2013.01); *F21S 43/195* (2018.01); *F21S 45/47* (2018.01); *F21V 23/006* (2013.01); *F21Y 2115/10* (2016.08)

(58) Field of Classification Search
CPC .............. F21S 41/192; F21S 41/43195; B60Q 1/0088; F21V 23/006
USPC ........................................................ 362/545
See application file for complete search history.

(56) References Cited

U.S. PATENT DOCUMENTS

| | | | |
|---|---|---|---|
| 8,222,820 B2 | 7/2012 | Wang et al. | |
| 2011/0121707 A1 | 5/2011 | Fan | |
| 2013/0039072 A1* | 2/2013 | Kim ...................... | F21V 3/0625 362/294 |

(Continued)

FOREIGN PATENT DOCUMENTS

| | | |
|---|---|---|
| KR | 10-2016-0045302 A | 4/2016 |
| KR | 10-2017-0023508 A | 3/2017 |

*Primary Examiner* — Christopher M Raabe
(74) *Attorney, Agent, or Firm* — Lee IP Law, P.C.

(57) ABSTRACT

A vehicle lamp device includes a housing with first and second seating portions in a first end portion thereof, the second seating portion including a surface at a higher plane than the first seating portion, a light source module substrate on the second seating portion with at least one light source, a driving module substrate on the first seating portion with at least one driving element, a bracket combined with the first end portion of the housing, the bracket covering the light source module substrate and the driving module substrate, and having an opening exposing the at least one light source, and at least one connection terminal extending from the first seating portion to the second seating portion along an inner surface of the bracket, the at least one connection terminal electrically connecting the light source module substrate and the driving module substrate.

20 Claims, 8 Drawing Sheets

(56) References Cited

U.S. PATENT DOCUMENTS

| | | | |
|---|---|---|---|
| 2014/0140067 A1* | 5/2014 | Chen | F21V 17/102 |
| | | | 362/294 |
| 2015/0181657 A1* | 6/2015 | Chen | F21V 23/006 |
| | | | 315/294 |
| 2015/0192254 A1 | 7/2015 | Moon et al. | |
| 2016/0059767 A1 | 3/2016 | Kwak et al. | |
| 2017/0284607 A1 | 10/2017 | Cheng | |

* cited by examiner

VEHICLE LAMP DEVICE AND METHOD OF MANUFACTURING THE SAME

CROSS-REFERENCE TO RELATED APPLICATION

Korean Patent Application No. 10-2018-0062924, filed on May 31, 2018, in the Korean Intellectual Property Office (KIPO), and entitled: "Vehicle Lamp Device and Method of Manufacturing the Same," is incorporated by reference herein in its entirety.

BACKGROUND

1. Field

Example embodiments relate to a vehicle lamp device and a method of manufacturing the vehicle lamp device. More particularly, example embodiments relate to a vehicle lamp device using light emitting diode (LED) and a method of manufacturing the vehicle lamp device.

2. Description of the Related Art

A vehicle lamp includes a housing having a light source unit for emitting light therein, and a connector for connecting an external power source with the housing to supply an electric power to the light source unit. Such a vehicle lamp may be used in a commercial vehicle.

SUMMARY

According to example embodiments, a vehicle lamp device may include a housing having a first seating portion and a second seating portion in a first end portion thereof, the second seating portion extending upwardly from the first seating portion to be positioned in a higher plane than the first seating portion, a light source module substrate mounted on the second seating portion, wherein at least one light source is mounted on the light source module substrate, a driving module substrate mounted on the first seating portion, wherein a driving element for driving the light source is mounted on the driving module substrate, a bracket combined with the first end portion of the housing to cover the light source module substrate and the driving module substrate and having an opening for emitting a light from the light source, and at least one connection terminal extending from the first seating portion and the second seating portion along an inner surface of the bracket to electrically connect the light source module substrate and the driving module substrate.

According to example embodiments, a vehicle lamp device may include a housing having a first seating portion and a second seating portion in a first end portion thereof, the second seating portion extending upwardly from the first seating portion to be positioned in a higher plane than the first seating portion, a light source module substrate mounted on the second seating portion, wherein at least one light source is mounted on the light source module, a driving module substrate mounted on the first seating portion, wherein a driving element for driving the light source is mounted on the driving module substrate, and a bracket combined with the first end portion of the housing to cover the light source module substrate and the driving module substrate, having an opening for emitting a light from the light source, and including at least one connection terminal extending from the first seating portion and the second seating portion along an inner surface of the bracket to electrically connect the light source module substrate and the driving module substrate.

According to example embodiments, a method of manufacturing a vehicle lamp device may include forming a housing with a first seating portion and a second seating portion in a first end portion thereof, the second seating portion extending upwardly from the first seating portion to be positioned in a higher plane than the first seating portion. A driving module substrate and a light source module substrate may be mounted on the first seating portion and the second seating portion, respectively. A bracket may be formed with a connection terminal by insert injection molding, the bracket including the connection terminal insert injection-molded on an inner surface of the bracket. The bracket may be combined with the first end portion of the housing to cover the light source module substrate and the driving module substrate such that the light source module substrate and the driving module substrate are electrically connected by the connection terminal.

BRIEF DESCRIPTION OF THE DRAWINGS

Features will become apparent to those of skill in the art by describing in detail exemplary embodiments with reference to the attached drawings, in which.

DETAILED DESCRIPTION

Hereinafter, example embodiments will be explained in detail with reference to the accompanying drawings.

Figure 1:
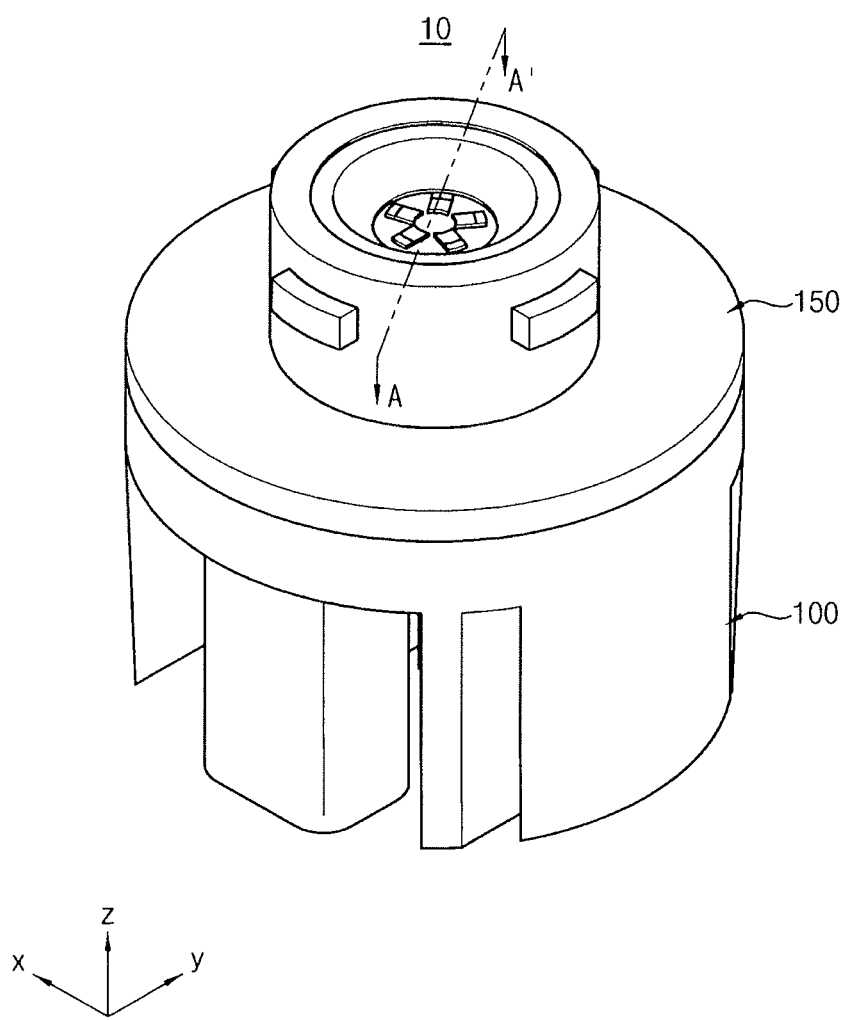
FIG. 1 illustrates a perspective view of a vehicle lamp device in accordance with example embodiments.
Figure 2:
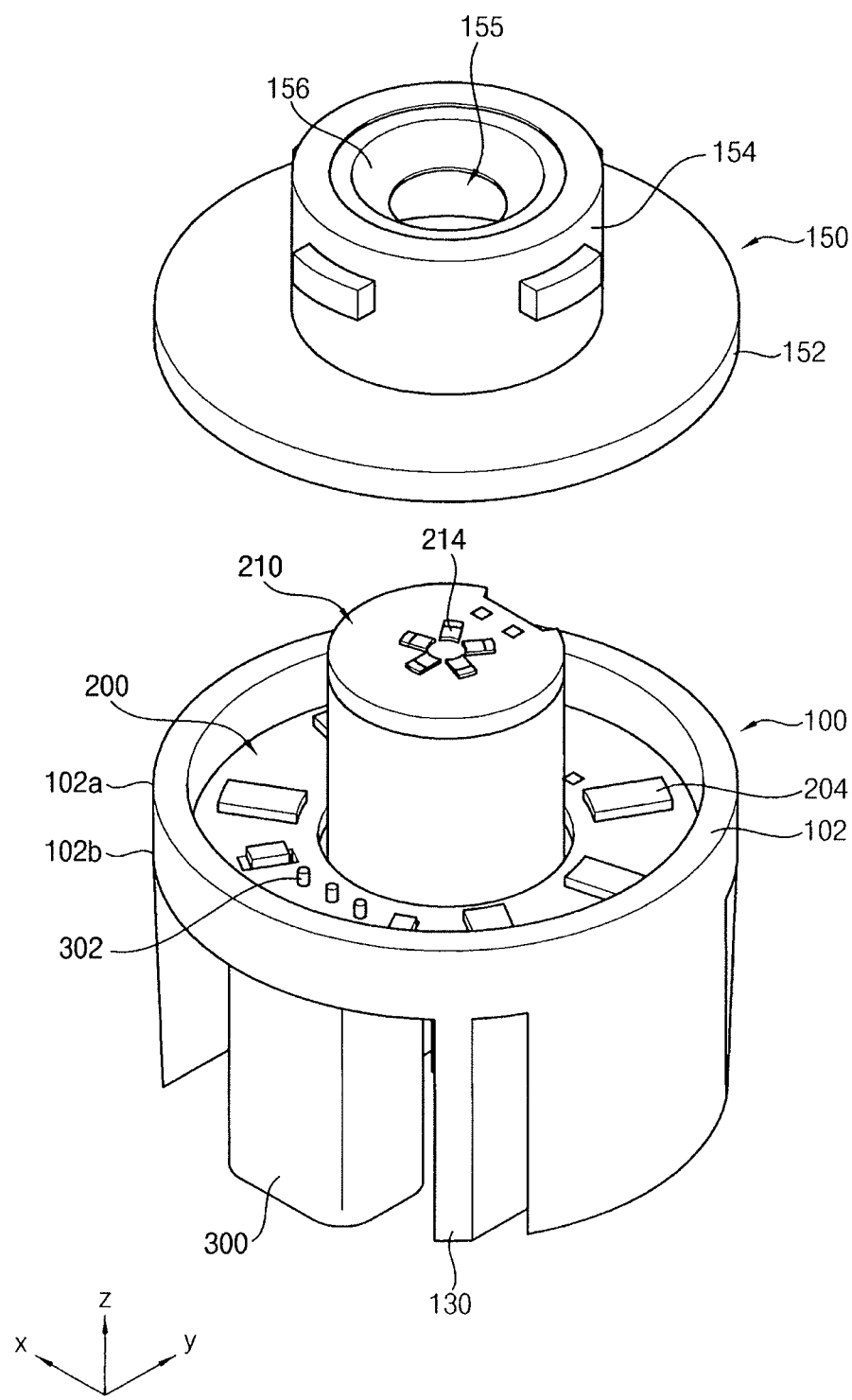
FIG. 2 illustrates an exploded perspective view of the vehicle lamp device in FIG. 1.
Figure 3:
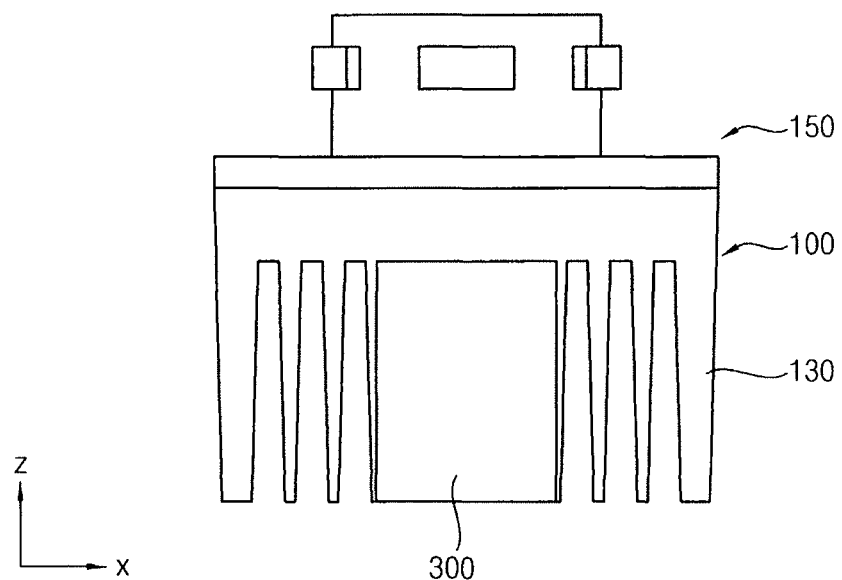
FIG. 3 illustrates a side view of the vehicle lamp device in FIG. 1.
Figure 4:
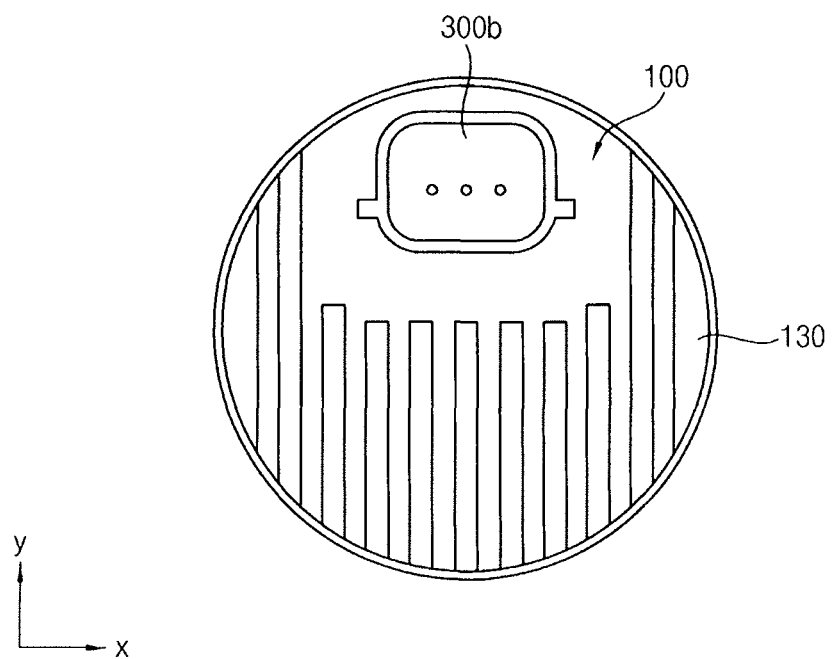
FIG. 4 illustrates a bottom view of the vehicle lamp device in FIG. 1.
Figure 5:
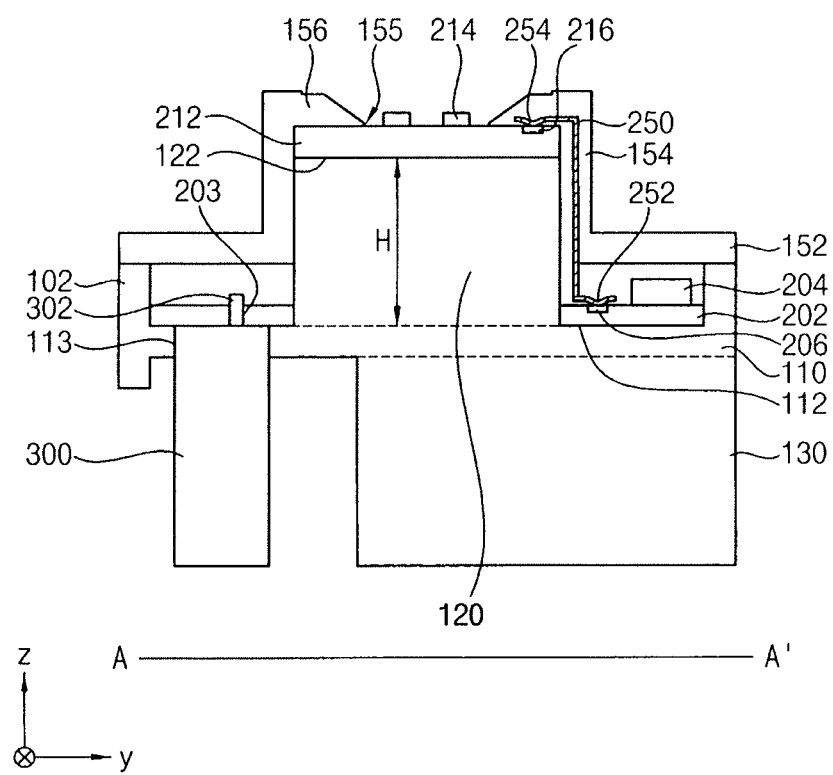
FIG. 5 illustrates a cross-sectional view along line A-A' in FIG. 1.
Figure 6:
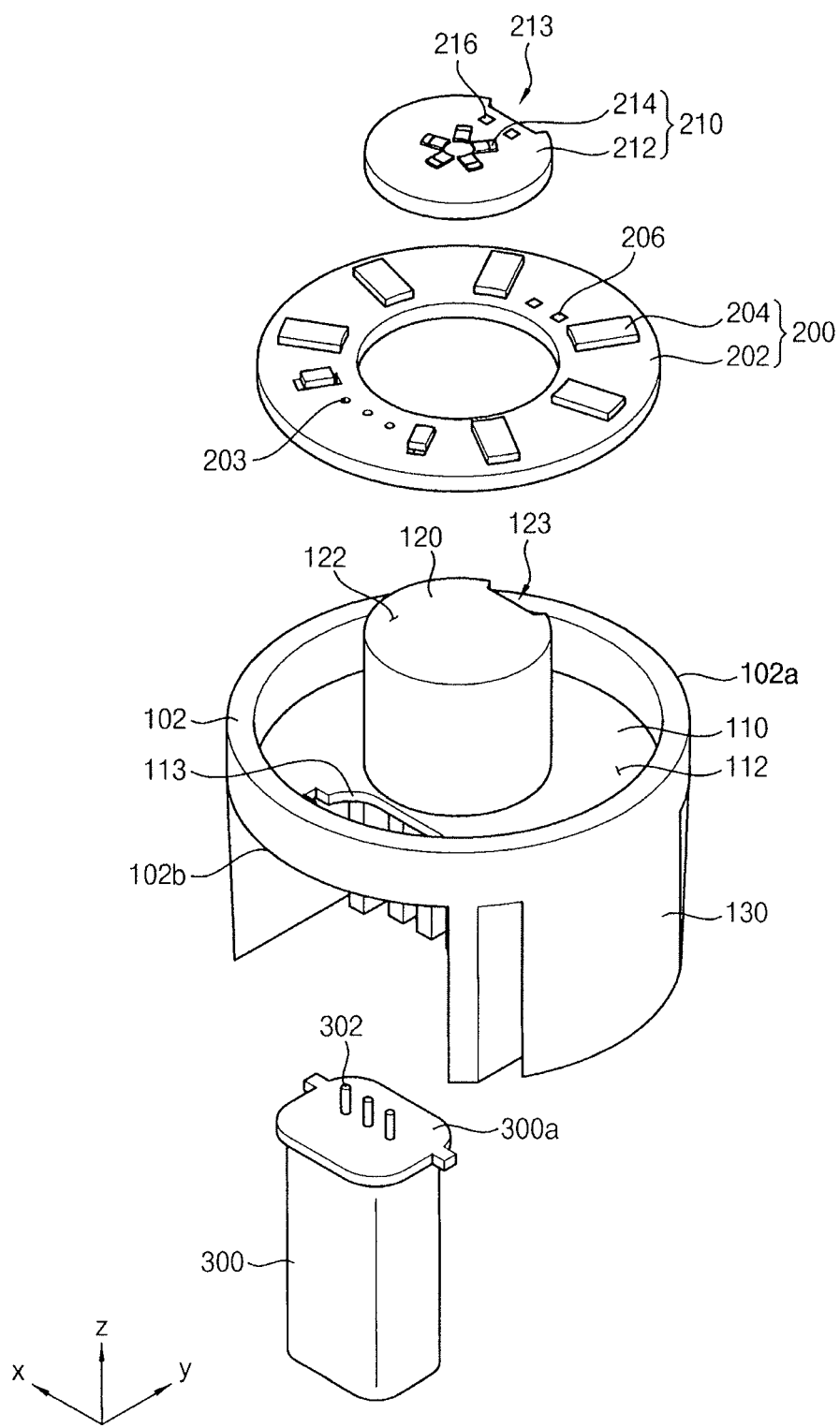
FIG. 6 illustrates an exploded perspective view of a lamp assembly in FIG. 2.
Figure 7:
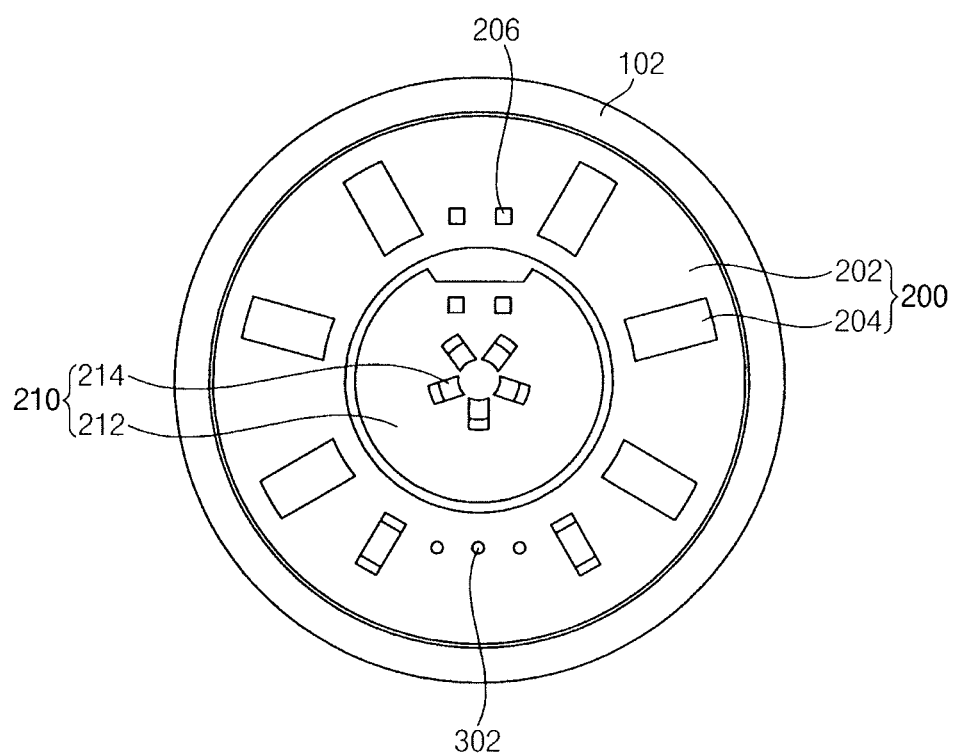
FIG. 7 illustrates a plan view of the lamp assembly in FIG. 6.
Figure 8:
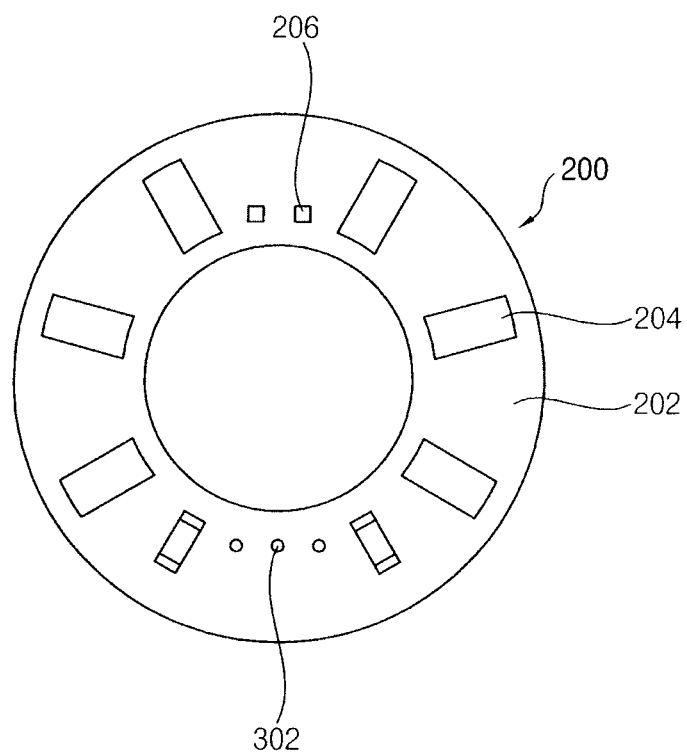
FIG. 8 illustrates a plan view of a driving module substrate in FIG. 6.
Figure 9:
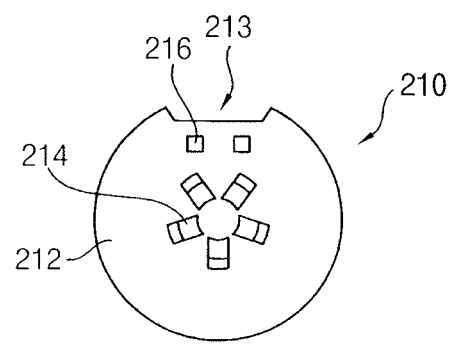
FIG. 9 illustrates a plan view of a light source module substrate in FIG. 6.

FIG. 1 is a perspective view illustrating a vehicle lamp device in accordance with example embodiments. FIG. 2 is an exploded perspective view illustrating the vehicle lamp device in FIG. 1. FIG. 3 is a side view illustrating the vehicle lamp device in FIG. 1. FIG. 4 is a bottom view illustrating the vehicle lamp device in FIG. 1. FIG. 5 is a cross-sectional view taken along the line A-A' in FIG. 1. FIG. 6 is an exploded perspective view illustrating a lamp assembly in FIG. 2. FIG. 7 is a plan view illustrating the lamp assembly in FIG. 6. FIG. 8 is a plan view illustrating a driving module substrate in FIG. 6. FIG. 9 is a plan view illustrating a light source module substrate in FIG. 6.

Referring to FIGS. 1 to 9, a vehicle lamp device 10 may include a lamp assembly 100 and a bracket 150 on the lamp assembly 100. The lamp assembly 100 may include a housing 102 and a light source unit received in the housing 102. In addition, the lamp assembly 100 may further include a connector 300. The light source unit may include a driving module 200 and a light source module 210. The driving module 200 may include driving elements 204 for controlling operations of a light source 214 (e.g., LED) of the light source module 210.

In example embodiments, the vehicle lamp device 10 may be mounted detachably on a front or rear of a vehicle to emit light. The vehicle lamp device 10 may be used as, e.g., a head lamp, a fog lamp, a tail lamp, a break lamp, etc.

In particular, as illustrated in FIG. 6, the housing 102 may form an outward shape of the vehicle lamp device 10, and may serve as a base body for mounting the light source unit. The housing 102 may include a first seating portion 110 and a second seating portion 120 in a first end portion 102a thereof, i.e., an open end. The second seating portion 120 may be positioned at a higher plane than the first seating portion 110, e.g., the second seating portion 120 may include a surface at a higher plane along the z axis than the first seating portion 110 relatively to a lowermost end of the vehicle lamp device 10.

In detail, referring to FIGS. 5-6, the second seating portion 120 may extend from a middle region of the first seating portion 110 by a predetermined height H. For example, as illustrated in FIG. 6, the second seating portion 120 may have a substantially cylindrical shape positioned at and extending from a center of the first seating portion 110. When viewed in a plan view, the first seating portion 110 may have a first seating surface 112 of an annular shape, and the second seating portion 120 may have a second seating surface 122 of a circular shape. The second seating surface 122 e.g., the top of the cylindrical shape, may be positioned higher than the first seating surface 112 by a predetermined height H, e.g., the height H may be the height of the cylindrical shape. The first seating surface 112 and the second seating surface 122 may be parallel with each other.

Referring to FIGS. 2-3, the housing 102 may include a plurality of radiation fins 130 in a second end portion 102b opposite to the first end portion 102a, e.g., the first and second end portions 102a and 102b may be opposite ends of the housing 102 along the z axis. The radiation fins 130 may protrude from a lower surface of the first seating portion 110 in a direction opposite to the protruding direction of the second seating portion 120, as illustrated in FIG. 5. That is, the radiation fins 130 and the second seating portion 120 may protrude from the first seating portion 110 in opposite directions along the z axis. The radiation fins 130 may be arranged in a direction parallel with the first seating surface 112 to be spaced apart from each other, e.g., the radiation fins 130 may be spaced apart from each other along the x axis and parallel to each other (FIG. 4).

The housing 102 may include a metal, e.g., aluminum. The housing 102 including the first and second seating portions 110 and 120, and the radiation fins 130 may be formed by die casting. For example, the first seating portion 110, the second seating portion 120, and the radiation fins 130 may be integral with each other to define a single and seamless structure (FIG. 4).

In example embodiments, the connector 300 for interconnection with an external electric power source may be coupled with the second end portion 102b of the housing 102 (FIG. 6). The connector 300 may be inserted fixedly into the second end portion 102b of the housing 102 between the radiation fins 130. As illustrated in FIG. 5, a first end portion of the connector 300 may be inserted into a connector penetration opening 113 of the first seating portion 110 to extend to a lower surface of a driving module substrate 202 which is mounted on the first seating portion 110, e.g., the connector penetration opening 113 may surround, e.g., trace the shape of, the first end portion of the connector 300. Connector pins 302 for electrical connection with the driving module substrate 202 may be provided in a first end portion 300a of the connector 300 to protrude from a surface of the first end portion 300a of the connector 300 into the driving module substrate 202 (FIGS. 2 and 6).

The connector 300 may be electrically connected to an external electric power source at a second end portion 300b to apply an electric power to the light source unit. The first end portion of the connector pin 302 may penetrate through a through hole 203 of the driving module substrate 202. The end portion of the connector pin 302 penetrating through the through hole 203 may be soldered to the driving module substrate 202. Thus, the connector pin 302 may be electrically connected to the driving module substrate 202.

In example embodiments, the light source unit may be mounted in the open first end portion 120a of the housing 102. As illustrated in FIG. 6, the driving module 200 may be mounted on the first seating portion 110, and the light source module 210 may be mounted on the second seating portion 120.

In particular, the driving module 200 may include the driving module substrate 202 and a plurality of the driving elements 204 mounted on the driving module substrate 202. The light source module 210 may include a light source module substrate 212 and a plurality of the light sources 214 mounted on the light source module substrate 212. The light source 214 may include a light emitting diode (LED) element. The driving module substrate 202 may have an annular shape corresponding to the first seating surface 112 of the first seating portion 110, and the light source module substrate 212 may have a circular shape corresponding to the second seating surface 122 of the second seating portion 120.

At least one connection terminal 250 may electrically connect the driving module substrate 202 and the light source module substrate 212 to each other, as illustrated in FIG. 5. The connection terminal 250 may extend in a vertical direction from the first seating portion 110 to the second seating portion 120. A first end portion 252 of the connection terminal 250 may make contact with a first pad 206 of the driving module substrate 202, and a second end portion 254 of the connection terminal 250 may make contact with a second pad 216 of the light source module substrate 212, to electrically connect the driving module substrate 202 and the light source module substrate 212.

Referring to FIG. 2, the bracket 150 may be combined with the first end portion 120a of the housing 102 to cover the light source module substrate 212 and the driving module substrate 202. The bracket 150 may include a first horizontal portion 152 extending laterally, e.g., in the xy plane in parallel to the driving module substrate 202, to cover the driving module substrate 202, a vertical portion 154 extending upwardly from the first horizontal portion 152 along an outer surface of the second seating portion 120, and a second horizontal portion 156 extending laterally from the vertical portion 154 to cover the light source module substrate 212.

For example, as illustrated in FIG. 2, the first and second horizontal portions 152 and 156 may be coupled to opposite ends of the vertical portion 514 along the z axis, and may extend in opposite direction in the xy plane relatively to the vertical portion 514. For example, as illustrated in FIG. 2, the vertical portion 154 may have a shape of a hollow cylinder, e.g., a cylindrical frame surrounding a perimeter of the second seating portion 120, while the first horizontal portion 152 may extend from a bottom of the cylindrical frame and away from an axis through a center of the second seating portion 120, and the second horizontal portion 156 may extend from a top of the cylindrical frame and toward the axis through the center of the second seating portion 120. For example, as illustrated in FIG. 1, an outer diameter of the first horizontal portion 152 of the bracket 150 may equal an outer diameter of the housing 102, e.g., at its first end portion 102a.

The second horizontal portion 156 may have an opening 155 for emitting light from the light source 214 on the light source module substrate 212. For example, as illustrated in FIG. 2, the opening 155 through the second horizontal portion 156 may align with and overlap a center of the light source module 210, e.g., to expose the light source 214. For example, the bracket 150 may include a plastic material, e.g., polycarbonate (PC). The bracket 150 may be formed by injection molding. e.g., the first horizontal portion 152, the vertical portion 154, and the second horizontal portion 156 may be formed integrally with each other as a single and seamless unit.

Since the housing 102 includes metal material, e.g., aluminum, the housing 102 may serve as a heat sink for dissipating heat from the light source module 210. The first seating portion 110 may be a first heat sink for dissipating heat from the driving module substrate 202, and the second seating portion 120 may be a second heat sink for dissipating heat from the light source module substrate 212. Accordingly, the first and second seating portions 110 and 120 of the vehicle lamp device 10 may provide a relatively larger heat dissipating area for the light source module.

In example embodiments, referring to FIG. 5, the connection terminal 250 may be insert injection-molded on an inner surface of the bracket 150 to be formed integrally with the bracket 150, e.g., the integral structure of the bracket 150 and the connection terminal 250 herein refers to simultaneous formation thereof via a same process. The insert injection molding may be a molding process of forming integrally a different metal material in a mold. For example, the connection terminal 250 of the metal material may be formed integrally in the bracket 150 of the plastic material by inset injection molding. For example, the metal material of the connection terminal 250 may be placed into a mold, and the plastic material of the bracket 150 may be injected into the same mold to form simultaneously the bracket 150 around, e.g., to surround, the connection terminal 250, e.g., the connection terminal 250 may be within the bracket 150 to extend through the vertical portion 154 and the second horizontal portion 156 of the bracket 150, e.g., thereby minimizing manufacturing stages and reducing costs.

The connection terminal 250 may extend from the first pad 206 of the driving module substrate 202 to the second pad 216 of the light source module substrate 212 along the inner surface of the bracket 150 to electrically connect the light source module substrate 212 and the driving module substrate 202. The connection terminal 250 may extend along a first recess 123 in a sidewall of the second seating portion 120 and along a second recess 213 in the light source module substrate 212 to be connected to the first recess 123, e.g., the first and second recesses 123 and 213 may be aligned to provide a level surface for the connection terminal 250 (FIG. 6).

As described previously, the vehicle lamp device 10 may include the light source module substrate 212 and the driving module substrate 202, the housing 102 including the first seating portion 110 to mount the driving module substrate 202 and the second seating portion 120 at a higher plane than the first seating portion 110 to mount the light source module substrate 212, and the bracket 150 having the at least one connection terminal 250 insert injection-molded in the inner surface of the bracket 150 to electrically connect the light source module substrate 212 and the driving module substrate 202. Accordingly, the first seating portion 110 and the second seating portion 120 may serve as the first and second heat sinks, respectively, for dissipating heat from the light source module substrate 212 and the driving module substrate 202, to thereby provide a relatively larger heat dissipating area and an enlarged mounting area.

Figure 10:
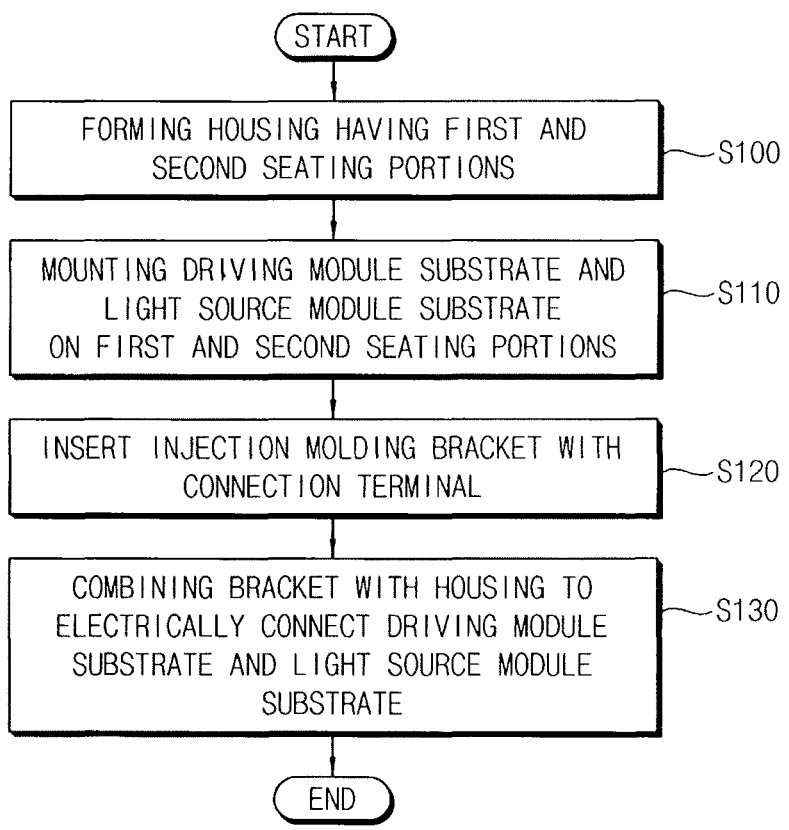
FIG. 10 illustrates a flow chart of a method of manufacturing a vehicle lamp device in accordance with example embodiments.

Hereinafter, a method of manufacturing the vehicle lamp device 10 will be explained with reference to FIGS. 1-9 and 10. FIG. 10 is a flow chart illustrating the method of manufacturing the vehicle lamp device 10.

Referring to FIGS. 1 to 10, first, the housing 102 with the first seating portion 110 and the second seating portion 120 may be formed (S100). Then, the driving module substrate 202 may be mounted on the first seating portion 110, and the light source module substrate 212 may be mounted on the second seating portion 120 (S110).

In example embodiments, the housing 102 including the first and second seating portions 110 and 120, as well as the radiation fins 130, may be formed by die casting. For example, the housing 102 may be formed by aluminum die casting.

The driving module substrate 202 may be mounted on the first seating portion 110, and the light source module substrate 212 may be mounted on the second seating portion 120. When viewed in a plan view, the first seating portion 110 may have a first seating surface 112 of an annular shape, and the second seating portion 120 may have a second seating surface 122 of a circular shape. The driving module substrate 202 may have an annular shape corresponding to, e.g., overlapping, the first seating surface 112, and the light source module substrate 212 may have a circular shape corresponding to, e.g., overlapping, the second seating surface 122.

Then, the connector 300 may be coupled to the housing 102. The connector 300 may be inserted fixedly into the second end portion 102b of the housing 102 between the radiation fins 130. A first end portion of the connector 300 may be inserted into the connector penetration opening 113 of the first seating portion 110 to extend to the lower surface of the driving module substrate 202 mounted on the first seating portion 110. The end portion of the connector pin 302 may penetrate through the through hole 203 of the driving module substrate 202, and the end portion of the connector pin 302 penetrating through the through hole 203 may be soldered to the driving module substrate 202. Thus, the connector pin 302 may be electrically connected to the driving module substrate 202.

Then, the connection terminal 250 may be insert injection-molded in, e.g., inside, the bracket 150 (S120). Therefore, the bracket 150 may be combined with the housing 102 to electrically connect the driving module substrate 202 and the light source module substrate 212.

In example embodiments, the connection terminal 250 may be insert injection-molded in, e.g., along, the inner surface of the bracket 150 to be formed integrally with the bracket 150. For example, the bracket 150 may include a plastic material, e.g., polycarbonate (PC), and the connection terminal 250 may include a metal material, e.g., copper, insert injection-molded into the plastic material of the bracket 150.

The bracket 150 may include the first horizontal portion 152 extending laterally to cover the driving module substrate 202, the vertical portion 154 extending upwardly from the first horizontal portion 152 along the outer surface of the second seating portion 120, and the second horizontal portion 156 extending laterally from the vertical portion 154 to cover the light source module substrate 212. The second horizontal portion 156 may have the opening 155 for emitting light from the light source 214 on the light source module substrate 212. A remaining portion of the connection terminal 250 except a first end portion 252 may be formed integrally with the inner surface of the vertical portion 154 and the second horizontal portion 156 of the bracket 150.

The bracket 150 may be combined with the first end portion 102a of the housing 102 to cover the light source module substrate 212 and the driving module substrate 202. As the bracket 150 is combined with the housing 102, the first end portion 252 of the connection terminal 250 may make contact with the first pad 206 on the driving module substrate 202 and the second end portion 254 of the connection terminal 250 may make contact with the second pad 216 on the light source module substrate 212. Thus, the driving module substrate 202 and the light source module substrate 212 may be electrically connected by the connection terminal 250.

By way of summation and review, when a vehicle lamp is employed in a commercial vehicle, because an input voltage is 24V or more, the number of driving elements may be increased. Thus, a relatively large dissipating area and components-mounting area may be required.

In contrast, example embodiments provide a vehicle lamp device having a relative large components-mounting area and excellent heat dissipating property. Example embodiments also provide a method of manufacturing the vehicle lamp device.

That is, according to example embodiments, a vehicle lamp device may include a light source module substrate and a driving module substrate on vertically spaced apart first and second seating portions at a same end of a housing. Accordingly, the first seating portion and the second seating portion may serve as the first and second heat sinks for dissipating heat from the light source module substrate and the driving module substrate, respectively, thereby providing a relatively larger heat dissipating area and an enlarged mounting area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A vehicle lamp device, comprising:
    a housing including a first seating portion and a second seating portion in a first end portion thereof, the second seating portion including a surface at a higher plane than the first seating portion;
    a light source module substrate on the second seating portion, at least one light source being on the light source module substrate;
    a driving module substrate on the first seating portion, at least one driving element for driving the light source being on the driving module substrate;
    a bracket combined with the first end portion of the housing, the bracket covering the light source module substrate and the driving module substrate, and the bracket having an opening exposing the at least one light source on the light source module substrate; and
    at least one connection terminal extending from the first seating portion to the second seating portion along an inner surface of the bracket, the at least one connection terminal electrically connecting the light source module substrate and the driving module substrate.

2. The vehicle lamp device as claimed in claim 1, wherein:
    the second seating portion extends upwardly from a middle region of the first seating portion by a predetermined height,
    the first seating portion has a first seating surface of an annular shape, and
    the second seating portion has a second seating surface of a circular shape, the second seating surface being the surface at the higher plane than the first seating portion.

3. The vehicle lamp device as claimed in claim 2, wherein the first seating surface and the second seating surface are parallel with each other.

4. The vehicle lamp device as claimed in claim 1, wherein the connection terminal is within the bracket, the connection terminal and the bracket being integral with each other.

5. The vehicle lamp device as claimed in claim 1, wherein the light source includes a light emitting diode (LED) device.

6. The vehicle lamp device as claimed in claim 1, wherein the housing includes a metal material and the bracket includes a plastic material.

7. The vehicle lamp device as claimed in claim 1, further comprising a connector to connect an external electric power source to a second end portion of the housing, the first and second end portions of the housing being opposite to each other.

8. The vehicle lamp device as claimed in claim 7, wherein the connector includes a connector pin electrically connected to the driving module substrate.

9. The vehicle lamp device as claimed in claim 7, wherein a first end portion of the connector is insertable into a connector penetration opening of the first seating portion to extend to a lower surface of the driving module substrate.

10. The vehicle lamp device as claimed in claim 1, wherein the housing includes a plurality of radiation fins at a second end portion of the housing opposite to the first end portion of the housing.

11. A vehicle lamp device, comprising:
    a housing including a first seating portion and a second seating portion in a first end portion thereof, the second seating portion extending upwardly from the first seating portion to have a surface at a higher plane than the first seating portion;
    a light source module substrate on the second seating portion, at least one light source being on the light source module substrate;

a driving module substrate on the first seating portion, at least one driving element being on the driving module substrate; and a bracket combined with the first end portion of the housing to cover the light source module substrate and the driving module substrate, the bracket including:

an opening exposing the at least one light source on the light source module substrate, and at least one connection terminal within the bracket and extending from the first seating portion to the second seating portion, the at least one connection terminal electrically connecting the light source module substrate and the driving module substrate.

12. The vehicle lamp device as claimed in claim 11, wherein:

the second seating portion extends upwardly from a middle region of the first seating portion by a predetermined height, the first seating portion has a first seating surface of an annular shape, and the second seating portion has a second seating surface of a circular shape, the second seating surface being the surface at the higher plane than the first seating portion.

13. The vehicle lamp device as claimed in claim 12, wherein the first seating surface and the second seating surface are parallel with each other.

14. The vehicle lamp device as claimed in claim 11, wherein the housing includes a metal material and the bracket includes a plastic material.

15. The vehicle lamp device as claimed in claim 11, further comprising a connector connecting an external electric power source to a second end portion of the housing, the first and second end portions of the housing being opposite to each other.

16. The vehicle lamp device as claimed in claim 11, wherein the housing includes a plurality of radiation fins at a second end portion of the housing opposite to the first end portion of the housing.

17. The vehicle lamp device as claimed in claim 11, wherein the at least one connection terminal is surrounded by a material of the bracket.

18. A method of manufacturing a vehicle lamp device, the method comprising;

forming a housing that includes a first seating portion and a second seating portion at a first end portion thereof, such that the second seating portion extends upwardly from the first seating portion to have a surface at a higher plane than the first seating portion;

mounting a driving module substrate with at least one light source and a light source module substrate with at least one driving element on the first seating portion and the second seating portion, respectively;

forming a bracket with a connection terminal by insert injection molding, such that the bracket includes the connection terminal insert injection-molded on an inner surface thereof; and combining the bracket with the first end portion of the housing to cover the light source module substrate and the driving module substrate, such that the light source module substrate and the driving module substrate are electrically connected by the connection terminal.

19. The method as claimed in claim 18, further comprising coupling a connector for interconnection with an external electric power source to a second end portion of the housing opposite to the first end portion of the housing.

20. The method as claimed in claim 18, wherein forming the housing includes forming the housing by die casting using aluminum.

* * * * *